US011716739B2

(12) United States Patent
Liu et al.

(10) Patent No.: US 11,716,739 B2
(45) Date of Patent: *Aug. 1, 2023

(54) METHOD AND APPARATUS FOR UPLINK TRANSMISSION

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

This patent is subject to a terminal disclaimer.

(21) Appl. No.: 17/148,906

(22) Filed: Jan. 14, 2021

(65) Prior Publication Data

US 2021/0136812 A1 May 6, 2021

Related U.S. Application Data

(63) Continuation of application No. 16/090,928, filed as application No. PCT/CN2018/101495 on Aug. 21, 2018, now Pat. No. 10,897,777.

(30) Foreign Application Priority Data

Aug. 21, 2018 (WO) ................ PCT/CN2018/101495

(51) Int. Cl.
*H04W 76/27* (2018.01)
*H04W 72/23* (2023.01)
*H04W 72/1268* (2023.01)
(52) U.S. Cl.
CPC ....... *H04W 72/23* (2023.01); *H04W 72/1268* (2013.01); *H04W 76/27* (2018.02)

(58) Field of Classification Search
CPC ............... H04W 72/14; H04W 72/042; H04W 72/1268; H04W 76/27; H04W 72/1284;
(Continued)

(56) References Cited

U.S. PATENT DOCUMENTS

| 2010/0074210 A1 | 3/2010 | Gaal et al. |
| 2010/0074231 A1 | 3/2010 | Hsu |

(Continued)

FOREIGN PATENT DOCUMENTS

| CA | 2859961 A1 | 6/2013 |
| CN | 101938841 A | 1/2011 |

(Continued)

OTHER PUBLICATIONS

"Enhancements to SR targeting low latency requirements", 3GPP TSG RAN WG1 Meeting #89; R1-1707406; Hangzhou, P. R. China, May 15-19, 2017, pp. 1-5.

(Continued)

*Primary Examiner* — Thai Nguyen
(74) *Attorney, Agent, or Firm* — Murphy, Bilak & Homiller, PLLC

(57) ABSTRACT

Embodiments include methods at a terminal device for uplink transmission in a wireless communication system. Such methods include determining a Scheduling Request (SR) transmission mode according to a configuration on SR transmission that is associated with a Logic Channel Group (LCG) that corresponds to a service needing uplink resources. Such methods include transmitting at least one SR signal to a network node according to the determined SR transmission mode, wherein the at least one SR signal indicates a resource request for uplink transmission. Other embodiments include complementary methods for a network node, and terminal devices and network nodes configured to perform such methods.

15 Claims, 6 Drawing Sheets

(58) Field of Classification Search
CPC ........... H04W 72/1278; H04W 72/048; H04W 72/0453
See application file for complete search history.

(56) References Cited

U.S. PATENT DOCUMENTS

| | | |
|---|---|---|
| 2012/0039263 A1 | 2/2012 | Moberg et al. |
| 2013/0163532 A1* | 6/2013 | Anderson ............. H04L 5/0053 370/329 |
| 2013/0163537 A1 | 6/2013 | Anderson et al. |
| 2014/0211767 A1 | 7/2014 | Lunttila et al. |
| 2016/0044701 A1 | 2/2016 | Zhang et al. |
| 2016/0105905 A1 | 4/2016 | Vajapeyam et al. |
| 2020/0288494 A1* | 9/2020 | Heo ................... H04W 72/1284 |

FOREIGN PATENT DOCUMENTS

| | | |
|---|---|---|
| CN | 102224685 A | 10/2011 |
| CN | 104160772 A | 11/2014 |
| CN | 105706514 A | 6/2016 |
| CN | 106160977 A | 11/2016 |
| CN | 106797646 A | 5/2017 |
| EP | 2437536 A1 | 4/2012 |
| EP | 2675081 A1 | 12/2013 |
| WO | 2013096555 A1 | 6/2013 |
| WO | 2016045991 A1 | 3/2016 |
| WO | 2016183733 A1 | 11/2016 |
| WO | 2016185895 A1 | 11/2016 |
| WO | 2016190592 A1 | 12/2016 |
| WO | 2017150828 A1 | 9/2017 |

OTHER PUBLICATIONS

"Consideration on the SR in NR", 3GPP TSG-RAN WG2 #99, R2-1708146, Berlin, Germany, Aug. 21-25, 2017, pp. 1-5.

"Handling of multiple SR configurations", 3GPP TSG RAN WG2 Meeting #99bis, R2-1710605, Prague, Czech Republic, Revision of R2-1708789, Oct. 9-13, 2017, pp. 1-6.

"SR procedure for NR", 3GPP TSG-RAN WG2 #99bis, R2-1710817, Prague, Czech Republic, Update of R2-1708766, Oct. 9-13, 2017, pp. 1-6.

"Discussion on SR", 3GPP TSG-RAN WG2 Meeting #99, R2-1707915, Berlin, Germany, Aug. 21-25, 2017, pp. 1-6.

"On low latency Scheduling Request", 3GPP TSG RAN1 WG Meeting #88bis; R1-1704756; Spokane, USA, Apr. 3-7, 2017, pp. 1-4.

* cited by examiner

METHOD AND APPARATUS FOR UPLINK TRANSMISSION

RELATED APPLICATIONS

This application is a continuation of, and claims the benefit of priority from, U.S. application. Ser. No. 16/090,928 filed on Oct. 3, 2018, which is a national-stage application claiming priority to international application PCT/CN2018/101495 filed on Aug. 21, 2018, which claims the benefit of PCT Application No. PCT/CN2017/111123 filed on Nov. 15, 2017. The entire disclosures of the above-mentioned applications are incorporated herein by reference for all purposes.

FIELD OF THE INVENTION

The present disclosure generally relates to wireless communications, and more specifically, to uplink transmission.

BACKGROUND

This section introduces aspects that may facilitate a better understanding of the disclosure. Accordingly, the statements of this section are to be read in this light and are not to be understood as admissions about what is in the prior art or what is not in the prior art.

In wireless communication system, a Scheduling Request (SR) is sent from a terminal device to network side, asking for uplink resource for communication, according to the instruction of configuration on SR transmission. In the discussion on next generation communication system such as 5G or new radio (NR), it is agreed that more than one SR configuration can be configured for a terminal device. A Logical Channel (LCH) can be mapped to a separate SR configuration, so that a network node can identify the LCH that trigger a SR upon reception of the SR.

In recent 3GPP discussion, it was agreed that an SR configuration may consists of a set of Physical Uplink Control Channel (PUCCH) resources. In other words, multiple SR signals can be transmitted in different frequency resources for a same SR trigger event. However, there is no signaling details on how to configure SR transmission under the agreed frame.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to a first aspect of the present disclosure, there is provided a method implemented at a terminal device. The method may comprise determining a SR transmission mode according to an obtained a configuration on Scheduling Request transmission corresponding to a Logic Channel Group, and transmitting at least one SR signal to a network node according to the determined SR transmission mode.

In accordance with an exemplary embodiment, the method according to the first aspect of the present disclosure may further comprise continuing for the above determining step and the transmitting step, in response to no uplink resource is granted after transmitting at least one SR signal to a network node according to the determined SR transmission mode.

In accordance with an exemplary embodiment, the method according to the first aspect of the present disclosure comprise determining a SR transmission diversity mode to be changed from a single SR transmission mode, after single SR transmission has been performed for a predefined time and no uplink resource is granted.

According to a second aspect of the present disclosure, there is provided there is provided a method implemented at a network node for uplink transmission. The method may comprise transmitting a configuration on Scheduling Request transmission mode corresponding to a LCG to a terminal device; receiving a SR signal from the terminal device; allocating uplink resource in response to the received SR signal; and transmitting an SR grant to the terminal device.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first and second aspects of the present disclosure.

According to a fourth aspect of the present disclosure, there is provided a computer-readable medium having computer program codes embodied thereon which, when executed on a computer, cause the computer to perform any step of the method according to the first aspect and second aspect of the present disclosure.

By means of the solutions set forth in the above aspects of the present disclosure and those as discussed hereinafter, SR transmission diversity with efficient signaling can be achieved.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 2 is also a diagram illustrating an example of SR duplicated transmission across carriers based on allocated SR resources according to one or more embodiments of the present disclosure;

FIG. 3 is also a diagram illustrating an example of SR transmission switching across carriers based on allocated SR resources according to an embodiment of the present disclosure;

FIG. 4 is a diagram illustrating an example of SR resource allocation across carriers corresponding to a SR transmission diversity mode according to an embodiment of the present disclosure;

DETAILED DESCRIPTION

Figure 1:
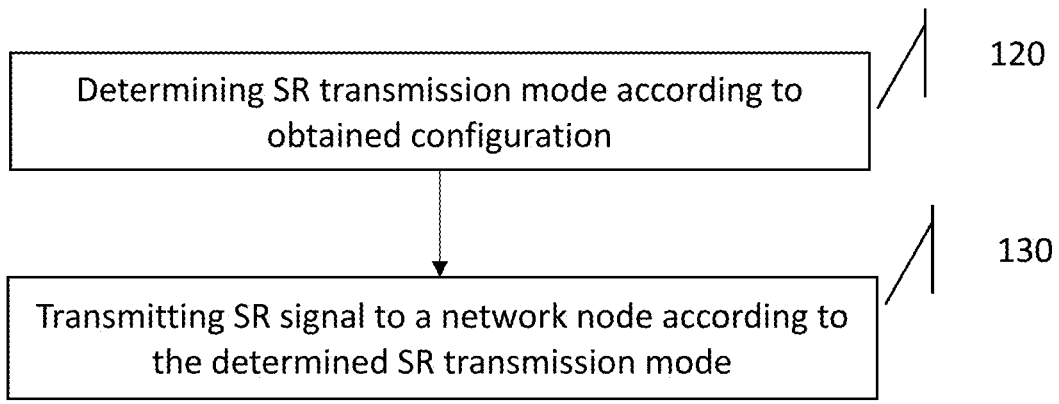
FIG. 1 illustrates an exemplary flow diagram for asking uplink resource process in a terminal device according to one or more embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as Next Radio (NR), long term evolution-advanced (LTE-A), LTE, wideband code division multiple access (WCDMA), high-speed packet access (HSPA), and so on. Furthermore, the communications between a terminal device and a network node in the wireless communication network may be performed according to any suitable generation communication protocols, including, but not limited to, the fourth generation (4G), 4.5G, the fifth generation (5G) communication protocols, and/or any other protocols either currently known or to be developed in the future.

The term "network node" refers to a network device in a wireless communication network via which a terminal device accesses to the network and receives services therefrom. The network device refers to a base station (BS), an access point (AP), a mobile management entity (MME), multi-cell/multicast coordination entity (MCE), a gateway, a server, a controller or any other suitable device in the wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, in an internet of things (IoT) scenario, the terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device.

The terminal device may also refer to a mobile terminal, user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, and the like.

The terminal device may support device-to-device (D2D) communication, for example by implementing a 3GPP standard for sidelink communication, and may in this case be referred to as a D2D communication device.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "according to" is to be read as "at least in part according to". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. A terminal device can be supplied with multiple types of services, even simultaneously. A service type corresponds to a Logic Channel Group (LCG) which consists of one or more Logic Channels (LCHs). For example, a media stream transmission may need two LCHs for audio and video transmission, separately. An SR configuration corresponds a service type provided by the wireless communication networks, which comprises a set of parameters which can be used to determine its associated SR resources, such as transmission periods and offsets of PUCCH occurrences, time-frequency resources, and power control parameters for PUCCH transmissions.

To meet dramatically increasing network requirements on delay sensitivity, one interesting option for communication technique development is to allow an SR configuration to comprise a collection of sets of PUCCH resources in a wireless communication network such as a NR or 5G system.

The present disclosure provides an embodiment in a wireless communication network, shown in FIG. 1, wherein a terminal device:

determines (120) SR transmission mode according to an obtained configuration on SR transmission corresponding to a Logic Channel Group (LCG); and transmits (130) at least one SR signal to a network node according to the determined SR transmission mode, asking for uplink grant for uplink transmission.

In the present disclosure, a SR transmission mode represents how SR signal is transmitted for uplink permission. According to some exemplary embodiments, a SR transmission mode can represent a single SR transmission. Periodic PUCCH resource, for example in every N subframe(s), is configured on one carrier for SR transmission, mapping onto a LCH or LCG. When an SR event is triggered, a terminal device transmits a SR signal on one of the periodic PUCCH resources which belong to a same carrier. A terminal device may further transmit more SR signals on more periodic PUCCH resources which belong to a same carrier, in case that an uplink grant is not received after the first SR is sent.

An SR transmission mode can be an SR transmission diversity mode. Periodic PUCCH resources corresponding to a specific service are configured on a plurality of carriers for SR transmission. An SR transmission diversity mode can represent an SR duplicated transmission across carriers or an SR transmission switching across carriers.

Figure 2:
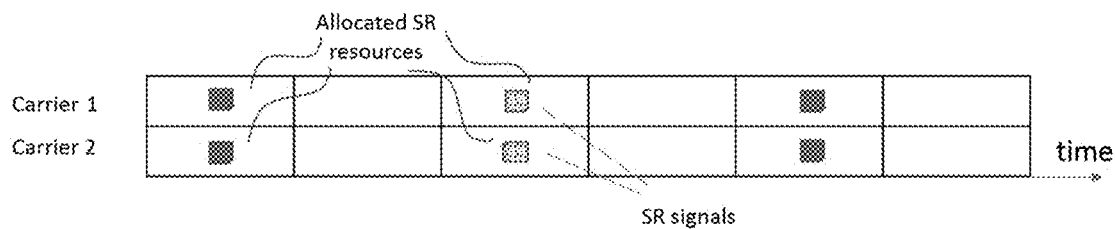
FIGS. 2-4 are diagrams illustrating examples of resource allocation on SR signaling corresponding to a SR transmission diversity mode according to some embodiments of the present disclosure.
Figure 3:
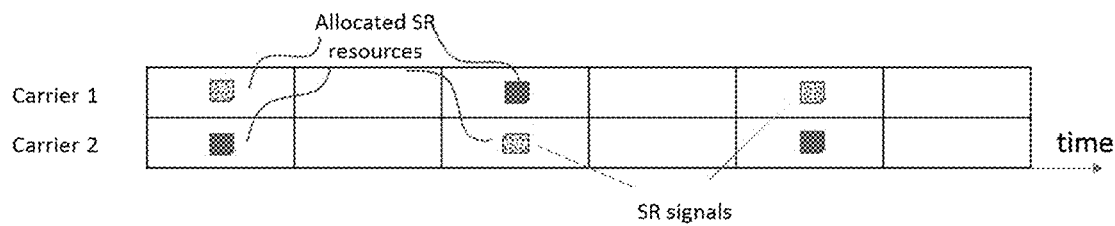

FIG. 2 and FIG. 3 are diagrams illustrating examples of SR transmission diversity mode. In FIG. 2 and FIG. 3, PUCCH resources allocated for SR duplicated transmission can be found in both carrier 1 and carrier 2. Each block in X-axis represents a subframe and it is only for simplicity that periodic PUCCH resources are allocated in every two subframes as an example. FIG. 2 illustrates an example of SR duplicated transmission. When an SR event is triggered, for example a service is initiated, two SR signals are both sent on PUCCH resources in carrier 1 and 2 at the first subframe shown in the figure. Two SR signals are sent on PUCCH resources in carrier 1 and 2 at a next subframe with PUCCH resource, for example the third subframe shown in the figure, in response to no uplink resource is granted after the first two SR signals are transmitted. SR transmission is duplicated across carriers instead of remaining in a single carrier, so that it would be easier for the network node to receive SR signal than it is in single SR transmission scenario.

FIG. 3 illustrates an example of SR transmission switching. When a SR event is triggered, an SR signal is sent on PUCCH resource in carrier 1 at the first subframe shown in the figure. In case that no granted resource is received, an SR signal is sent on PUCCH resource in carrier 2 at a next subframe with PUCCH resource, for example the third subframe shown in the figure. SR transmission is switched between carriers instead of remaining in a single carrier, so that it would be easier for the network node to receive SR signal than it is in single SR transmission scenario. Compared to SR transmission switching across carriers, SR duplicated transmission would be more suitable for delay sensitive service, however, its signal overhead is more than that of SR transmission switching. Therefore, SR transmission switching across carriers would be a balance between delay sensitivity and signal overhead. By choosing different SR transmission mode, a terminal device can satisfy different service requirement with efficient signaling.

Figure 4:
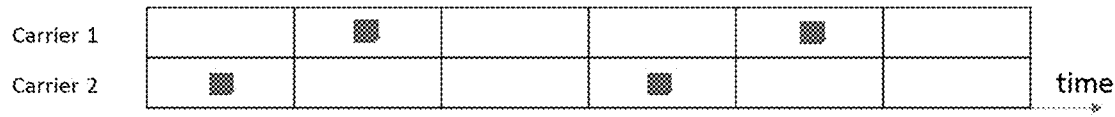

It is noted that PUCCH resource for SR transmission illustrated in FIG. 2 and FIG. 3 is just exemplary scenario. As another example, PUCCH resources allocated for SR transmission switching can only be the dotted blocks shown in FIG. 3 in which the SR signals are transmitted. In another exemplary scenario, PUCCH resources allocated for SR transmission in separate carriers can have distinguished periodic appearance. For example, there are one SR resource allocated in carrier 1 at every four subframes, and one SR resource allocated in carrier 2 at every two subframes. In another exemplary scenario, PUCCH resources allocated for SR transmission in different carriers are not necessarily align in time domain. As is shown in FIG. 4, staggered solid blocks are allocated for PUCCH resource for SR transmission. Solid blocks at the first and second subframes, in carrier 2 and carrier 1 respectively, can be utilized for a SR duplicated transmission.

Figure 5:
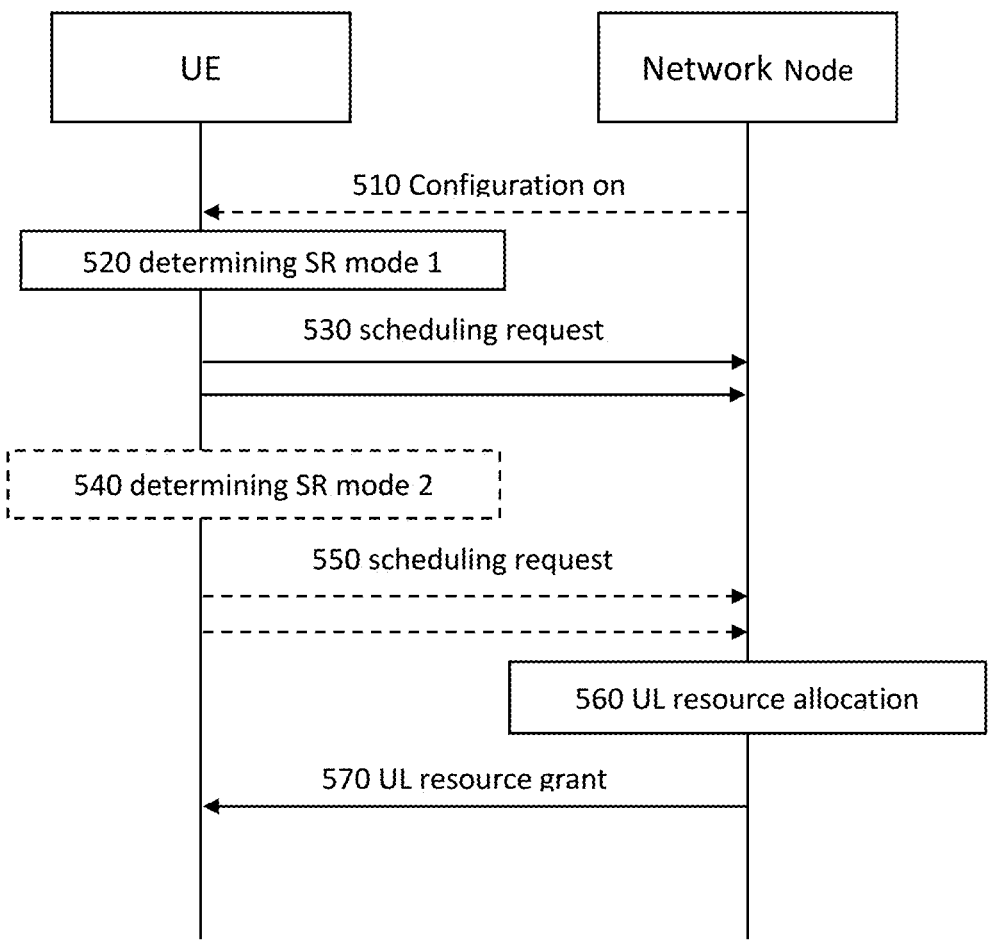
FIG. 5 is a diagram illustrating examples of a UE asking for uplink resource from a gNB through SR signaling according to an embodiment of the present disclosure.

In an exemplary embodiment shown in FIG. 5, an SR transmission mode is firstly determined (520) by a User Equipment (UE) as a single SR transmission mode (SR mode 1), according to an obtained configuration on SR transmission. There would be multiple configurations on SR transmission mode obtained in the UE, corresponding to multiple types of services the communication networks can provide. An SR trigger event may be a service desired by the UE, then a LCG corresponding to the desired service would be used by the UE to select a configuration on SR transmission to which the LCG is mapped. In some circumstance, the LCG corresponding to the desired service consists of one LCH.

After the single SR transmission mode is determined, the UE sends a SR signal (530) to a gNB, asking for uplink resource. However, the SR signal fails to reach the gNB thus no response is heard. The UE sends a second SR signal to the gNB and then still gets no feedback.

According to the configuration on SR transmission, the UE decides to continue determining its SR transmission mode, since a predefined time of SR transmission on mode 1 had been performed till no feedback is got. The predefined time is 2 in this exemplary embodiment. The UE determines (540) a SR transmission diversity mode (SR mode 2) to substitute the single SR transmission mode. In other words, the determined SR transmission mode changes from a single SR transmission mode to a SR transmission diversity mode.

In an example, after UE determines a SR duplicated transmission across carriers as the SR transmission diversity mode, it sends (550) an SR signal separately in carrier 1 and carrier 2, i.e. on different PUCCHs, as shown in FIG. 2. At least one of the SR signals is received by the gNB, and then recognized by the gNB for the specific SR resource assigned to the specific UE. The gNB allocates (560) uplink resource and sends (570) a Scheduling Grant to the UE.

In another example, after UE determines a SR transmission switching across carriers as the SR transmission diversity mode, it sends (550) a SR signal in carrier 1, then another SR signal in carrier 2, i.e. in different resource blocks as shown in FIG. 3. Since carrier 2 has better communication quality than carrier 1, the second SR signal is received and handled (560) by the gNB. As a result, a Scheduling Grant is received by the UE to allocate uplink resource for PUSCH transmission.

FIG. 5 would illustrate another exemplary embodiment. SR mode 1 is determined (520) as a SR transmission switching mode in a UE, according to a selected SR transmission configuration corresponding to a LCG mapping to a desired service. After SR signals has been transmitted (530) for a predefined time, no feedback is received by the UE. Then the UE would make a second determination on SR transmission mode according to the configuration on SR transmission, thus SR duplicated transmission mode (mode 2) is determined (540). A plurality of SR signals is transmitted (550) by the UE and at least one of them successfully arrives at the gNB. The gNB makes (560) an uplink resource allocation and then sends (570) a SR grant to the UE.

FIG. 5 would illustrate another exemplary embodiment. Due to a desired service requires very limited delay, SR mode 1 is determined (520) as a SR duplicated transmission mode in a UE, according to a selected SR transmission configuration corresponding to a LCG mapping to the service. A gNB receives (560) at least one of the SR signals and sends (570) SR grant to the UE. In this exemplary embodiment, there is neither second determination on SR transmission mode nor continued SR transmission after the second determination, which readers can find the block 540 and arrows 540 in FIG. 5 are drawn with dotted lines.

From above exemplary embodiments, a configuration on SR transmission may include information on a LCG corresponding to a service provided by the communication network. A possible implementation is to include a list of LCH IDs (LCIDs) in the configuration on SR transmission, the corresponding LCHs belonging to the LCG. Another possible implementation further reducing signal overhead, a bitmap for the LCHs is included as the information on the LCG. Each bit in the bitmap indicates the corresponding LCH, the bit position matching with the LCID or the LCH priority. SR resources (i.e. PUCCH resources) are also included in the configuration on SR transmission.

A configuration on SR transmission may also include limited time for SR transmission regarding a SR transmission mode. As described above, a first predefined time is set for single SR transmission mode, for a threshold of whether to switch to a SR transmission diversity mode. Similarly, a second predefined time can be set for SR transmission diversity mode (which is not necessarily switched from single SR transmission mode). If there is no SR grant received after the second predefined time, UE may apply uplink resource through contention-based random access procedure.

Instead of the second predefined time of SR transmission, a predefined period is also provided herein as a link adaption scheme by introducing a timer. The timer starts to count when SR transmission diversity mode is determined, or when SR transmissions are performed according to a SR transmission diversity mode. When the timer expires, the SR transmission mode is determined as single SR transmission mode. In other words, SR transmission diversity is disabled. The timer is for buffering the always-changing channel quality. Such scheme can adaptively adjust the SR transmission diversity without additional signaling overhead.

Therefore, a configuration on SR transmission regarding a provided service may comprise one or more SR transmission modes. It could be a SR transmission diversity mode, or two or more SR transmission modes, and a condition that the UE would switch from one mode to another once the condition is satisfied.

Instead of explicit indication on SR transmission mode is included in a configuration on SR transmission, for example, by SR transmission mode index, an indicator on whether SR diversity mode is enable or disabled can be included in another exemplary embodiment. Specifically, in an example, an indication of SR transmission diversity being enabled is included in a configuration on SR transmission. PUCCH resources on different carriers are allocated for the UE for SR transmission. In another example, an indication of SR transmission diversity being disabled by default is included, as well as a condition for the UE to enable its SR transmission diversity mode. The condition can be a predefined time that the UE sends SR signals, or a preset period that the UE sends SR signals to the gNB.

According to an exemplary embodiment, the obtained (510) configuration on SR transmission can have difference sources. In an example, a terminal device obtains the configuration on SR transmission through a Radio Resource Control (RRC) message from a network node. For example, an Information Element (IE) included in an RRC message such as SchedulingRequestConfig indicates periodic resources for SR transmission for specific terminal device, so that the network node can identify the specific terminal device through one of the indicated resources for SR transmission, upon receipt of an SR signal.

In another example, the terminal device obtains the configuration on SR transmission through a Physical Downlink Control Channel (PDCCH) order or Media Access Control (MAC) Control Element (CE) message from the network node. Compared to the semi-static RRC message indicating configuration on SR transmission mentioned above, PCDDH order or MAC CE message would be dynamically sent to the terminal device, reflecting the network node's determination on resource control. According to the examples described above, an obtaining step which is not shown in FIG. 1 can be further comprised in a method embodiment.

In another example, the configuration on SR transmission is predefined or preconfigured in the terminal device. In a further exemplary embodiment, an RRC message indicating a configuration on SR transmission is sent to a terminal device which is preconfigured with a configuration on SR transmission. Furthermore, the terminal device would receive a PDCCH order indicating a configuration on SR transmission. In that case, the terminal device determines its SR transmission mode according to the latest obtained configuration.

In the exemplary embodiment regarding the obtaining of configuration on SR transmission, not only SR resources are indicated in the configuration, but corresponding SR transmission mode(s). In an example, a terminal device can obtain different configurations on SR transmission mode through different resources. A predetermined configuration on SR transmission regarding a LCG is a single SR transmission mode, and SR resources in a carrier at periodic subframes. In other words, SR transmission diversity mode is disabled by default. A PDCCH order carrying a configuration on SR transmission regarding another LCG is obtained by the terminal device, indicating a SR duplicated transmission mode and SR resources across carriers at periodic subframes. In other words, SR duplicated transmission mode is enabled by the PDCCH order. When the terminal device is triggered by an SR event corresponding to the other LCG, more than one SR signals on different carriers are sent to the network node, according to the SR duplicated transmission mode. Those skilled in the art would easily think of analogical examples in which SR transmission switching mode is involved.

In yet another exemplary embodiment, a method implemented by a network node is provided herein for uplink transmission management. The method comprises:

transmitting (510, 610) a configuration on Scheduling Request, SR, transmission mode corresponding to a LCG, to a terminal device;

receiving (620) a SR signal from the terminal device;

allocating (560, 630) uplink resource in response to the received SR signal; and transmitting (570, 640) an SR grant to the terminal device.

According to aforementioned embodiments, the configuration corresponding to the LCG can be transmitted through RRC message. Alternatively, the configuration corresponding the LCG representing a service type can be carried through a PDCCH order, or a MAC CE. The network node can analyze channel quality, such as path loss, interference and coding scheme, at least partially based on measurement report from terminal devices, then determine a configuration on SR transmission corresponding to the channel. The configuration information corresponding to the LCG in a PDCCH order or MAC CE can also override an existing configuration on SR transmission indicated in a previous RRC message, PDCCH order or MAC CE.

The proposed solution according to one or more exemplary embodiments can enable a network node such as a gNB to configure a specific UE with an SR transmission configuration mapping on an LCG which corresponding to specific type of provided service. When it is foreseen that single SR transmission mode is hard to meet the requirement of transmission reliability, the network node can dynamically configure the terminal device to switch to an SR diversity mode in which allocated PUCCH resources in carriers for SR transmission would be concurrently or subsequently utilized in time domain. SR transmission diversity can be achieved with efficient signaling overhead. With the obtained SR transmission configuration, a UE can determine an appropriate SR transmission mode for the desired service. If transmission delay is more concerned than signaling overhead, a SR transmission diversity mode might be set as default mode. If signaling overhead is also important, single SR transmission mode might be selected first. Then a SR transmission diversity mode might be enabled when no uplink granted is received.

Correspondingly, with received SR signals, a network node assigns different processes according to different required services. For example, the network node first assigns the resources to the LCHs mapping to Ultra Reliable and Low Latency Communication (URLLC) service. In such a case, scheduling delay for LCHs can be shortened especially with strict latency requirements.

Figure 6:
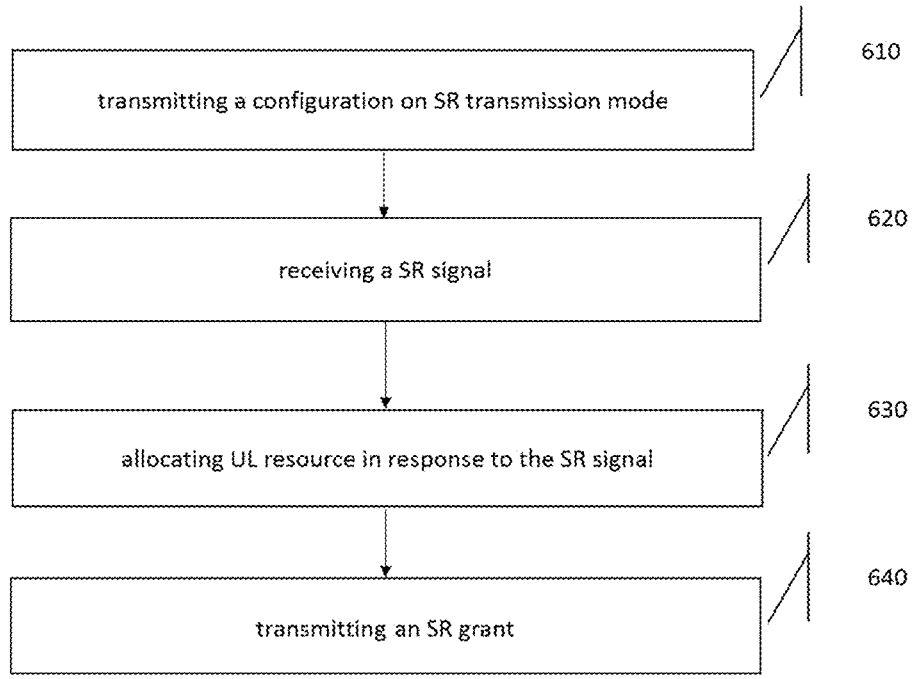
FIG. 6 illustrates an exemplary flow diagram for uplink resource management process in a network node according to one or more embodiments of the present disclosure.

The various blocks shown in FIG. 1 and FIG. 5-6 may be viewed as method steps, and/or as operations that result from operation of computer program code, and/or as a plurality of coupled logic circuit elements constructed to carry out the associated function(s). The flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods.

Figure 7:
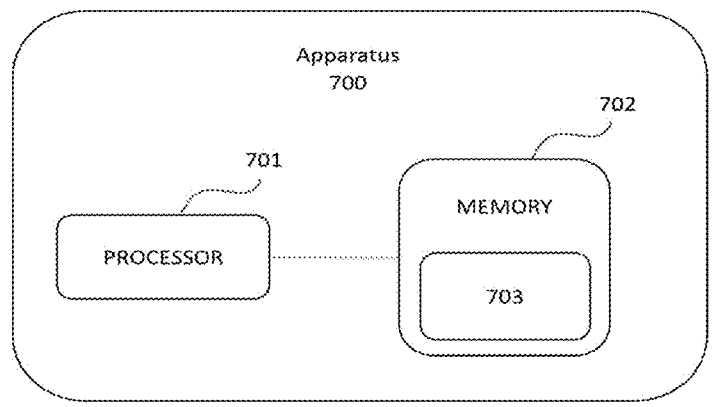
FIG. 7 is a block diagram illustrating an apparatus according to one or more embodiments of the present disclosure.

FIG. 7 is a block diagram illustrating an apparatus according to various embodiments of the present disclosure. Specifically, an apparatus (700) may comprise one or more processors such as processor (701) and one or more memories such as memory (702) storing computer program codes (703). The memory (702) may be non-transitory machine/processor/computer readable storage medium. In some implementations, the one or more memories (702) and the computer program codes (703) may be configured to, with the one or more processors (701), cause the apparatus (700) at least to perform any operation of the method as described in connection with FIG. 1 and FIG. 5.

In other implementations, the one or more memories (702) and the computer program codes (703) in FIG. 7 may be configured to, with the one or more processors (701), cause the apparatus (700) at least to perform any operation of the method as described in connection with FIG. 5 and FIG. 6.

Alternatively or additionally, the one or more memories 1102 and the computer program codes 1103 may be configured to, with the one or more processors 1101, cause the apparatus 1100 at least to perform more or less operations to implement the proposed methods according to the exemplary embodiments of the present disclosure.

Figure 8:
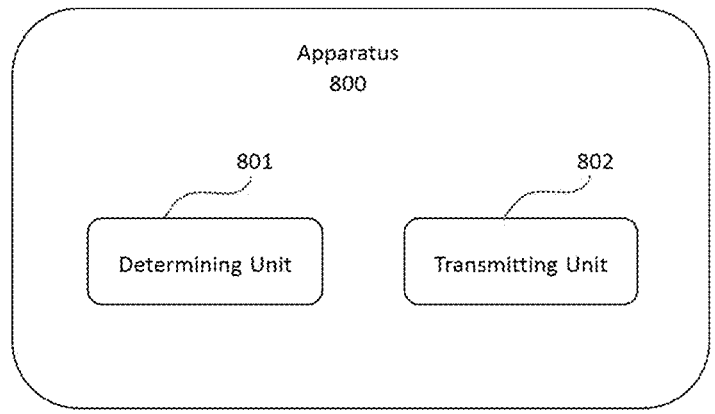
FIG. 8 is a block diagram illustrating an apparatus according to one or more embodiments of the present disclosure.

FIG. 8 is a block diagram illustrating an apparatus (800) according to another embodiment of the present disclosure. As shown in FIG. 8, the apparatus (800) may comprise a determining unit (801) and a transmitting unit (802). In an exemplary embodiment, the apparatus (800) may be implemented at a terminal device such as a UE. The determining unit (801) may be operable to determine (120) SR transmission mode according to an obtained a configuration on SR transmission corresponding to a LCG, and the transmitting unit (802) may be operable to transmit (130) at least one SR signal to a network node according to the determined SR transmission mode. Optionally, a receiving unit which is not shown in FIG. 8 may be operable to obtain the configuration on SR transmission from a network node. Optionally, the determining unit (801) and/or the transmitting unit (802) may be operable to carry out more or less operations to implement the proposed methods according to the exemplary embodiments of the present disclosure.

Figure 9:
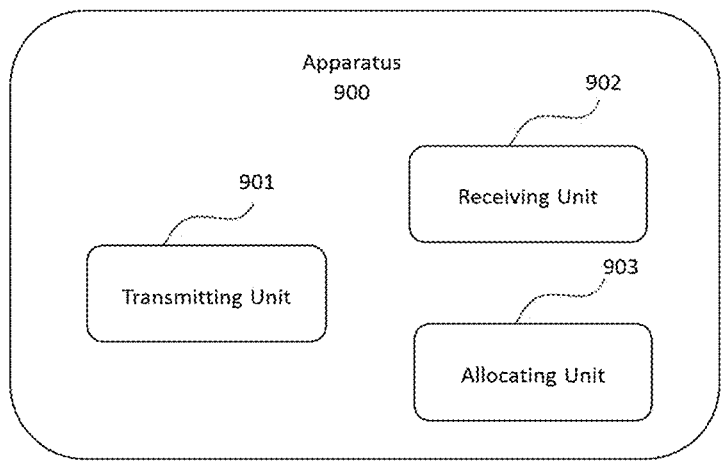
FIG. 9 is a block diagram illustrating an apparatus according to one or more embodiments of the present disclosure.

FIG. 9 is a block diagram illustrating an apparatus (900) according to another embodiment of the present disclosure. As shown in FIG. 9, the apparatus (900) may comprise a transmitting unit (901), a receiving unit (902) and an allocating unit (903). In an exemplary embodiment, the apparatus (900) may be implemented at a network node such as a gNB. The transmitting unit (901) may be operable to transmit a configuration on SR transmission corresponding to a LCG, and later an SR grant to a terminal device. The receiving unit (902) may be operable to receive a SR signal from the terminal device; the allocating unit (903) may be operable to allocate uplink resource in response to the received SR signal. Optionally, a determining unit which is not shown in FIG. 9 may be operable to determine the configuration on SR transmission before transmitting to the terminal device. Optionally, the transmitting unit (901), the receiving unit (902) and/or allocating unit (903) may be operable to carry out more or less operations to implement the proposed methods according to the exemplary embodiments of the present disclosure.

Figure 10:
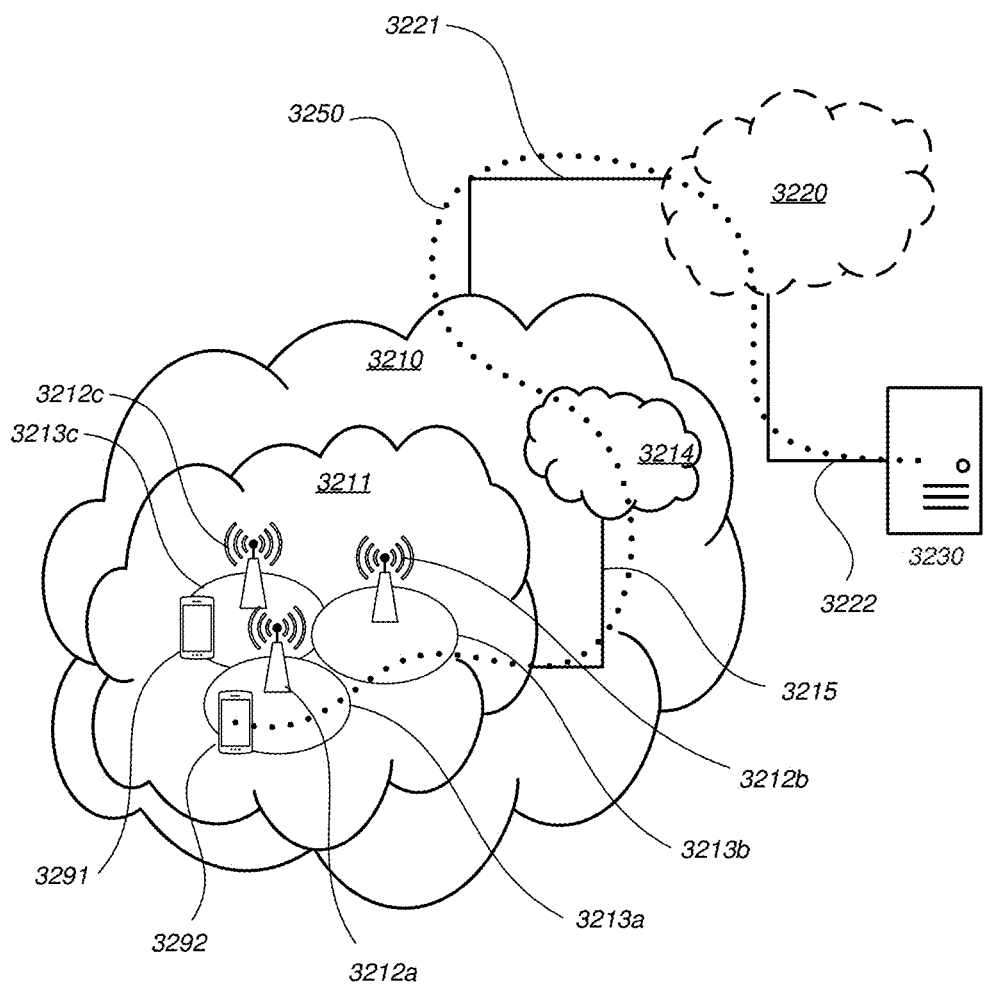
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

Figure 11:
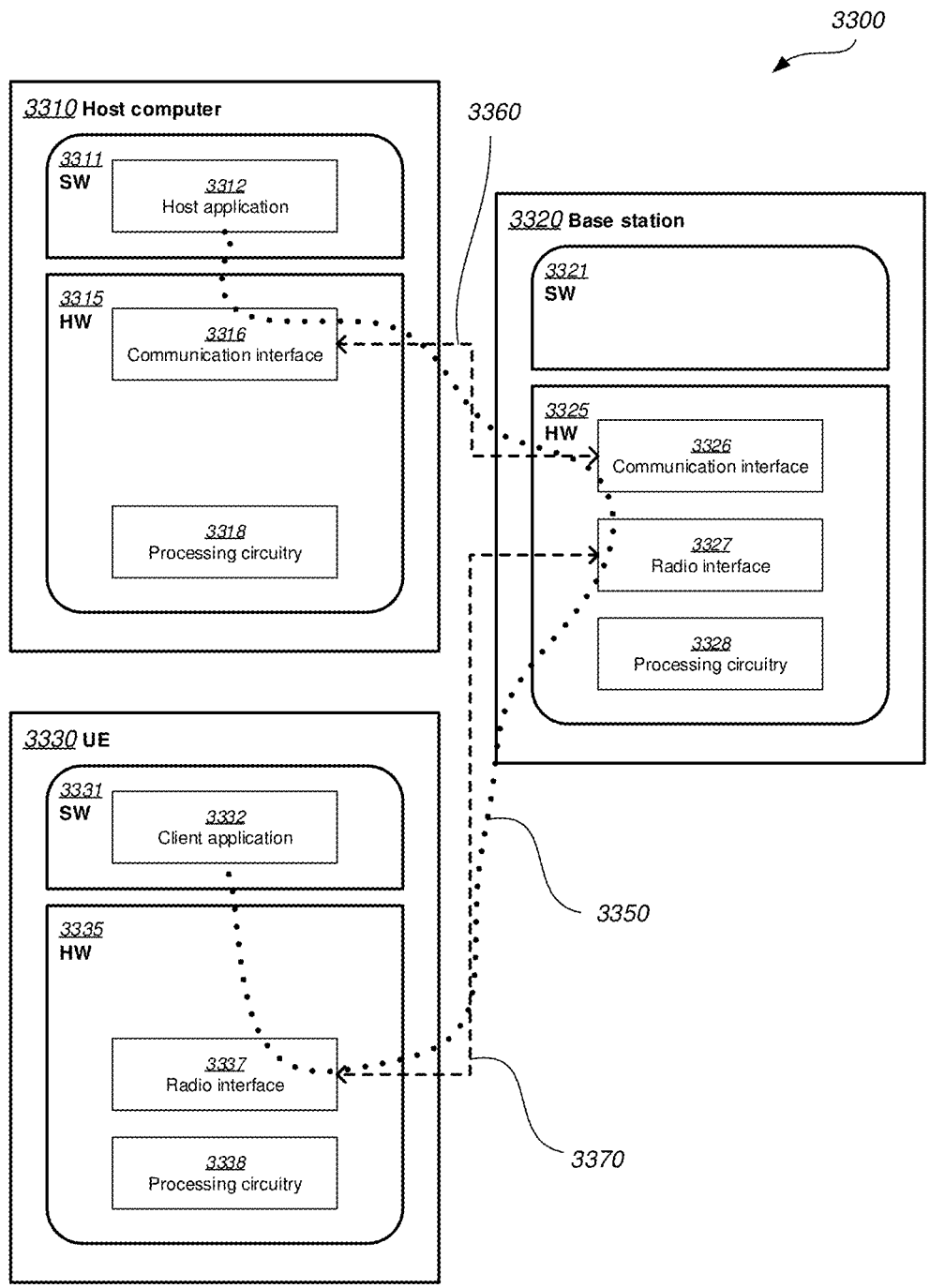
FIG. 11 is a generalized block diagram of a host computer communicating via a base station with a user equipment over a partially wireless connection.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of those embodiments may enable SR transmission diversity with signal efficiency and thereby provide benefits such as better user experience and network load balance.

Another scheduling request procedure may be provided for the purpose of efficiency, latency and other factors on which the one or more embodiments improve. There may further be an optional network functionality for reconfiguring the OTT connection 3350 between the host computer 3310 and UE 3330, in response to variations in desired service. The scheduling request procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the scheduling request procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art.

Figures 12, 13:
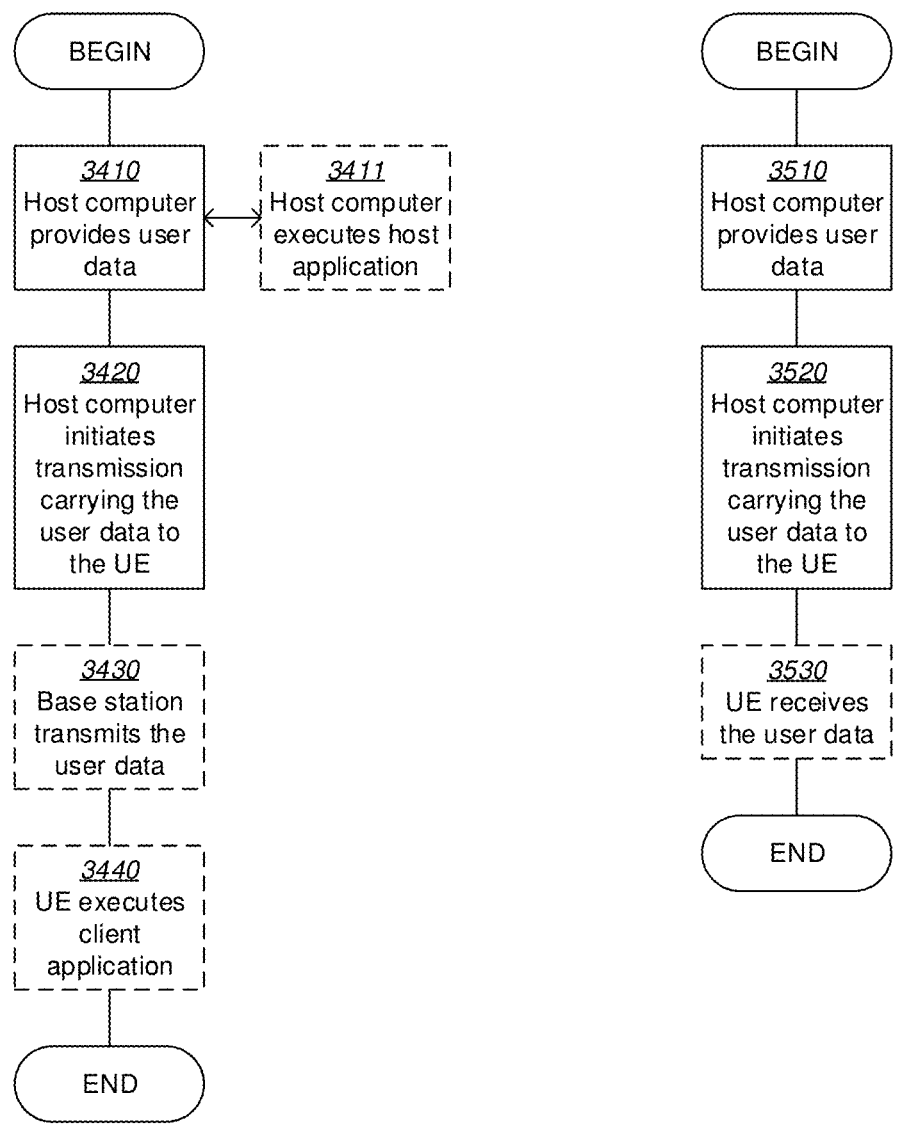
FIGS. 12 and 13 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits (for example, through a beam) to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated, and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method for a terminal device configured to operate in a wireless communication network, the method comprising:
    determining a Scheduling Request (SR) transmission mode according to a configuration on SR transmission that is associated with a Logic Channel Group (LCG), wherein:
        the LCG corresponds to a service needing uplink resources,
        the determined SR transmission mode is selected by the terminal device from a plurality of SR transmission modes associated with the configuration, and
        the plurality of SR transmission modes include:
            a first mode in which the terminal device switches an SR transmission between multiple carriers during multiple subframes, and
            a second mode in which the terminal device duplicates an SR transmission on multiple carriers during a subframe; and
    transmitting at least one SR signal to a network node in the wireless communication network, wherein the at least one SR signal indicates a resource request for uplink transmission and is transmitted according to the determined SR transmission mode.

2. The method according to claim 1, further comprising: in response to no uplink resource being granted after transmitting the at least one SR signal, determining a further SR transmission mode and transmitting at least one further SR signal, including a resource request for uplink transmission, to the network node according to the determined further SR transmission mode.

3. The method according to claim 2, wherein:
the determined SR transmission mode is the first mode;
transmitting the at least one SR signal is performed for a predefined period using the first mode; and
the determined further SR transmission mode is the second mode.

4. The method according to claim 1, wherein the configuration on SR transmission is obtained based on one or more of the following:
a Radio Resource Control (RRC) message from the network node;
Physical Downlink Control Channel (PDCCH) order or Media Access Control (MAC) Control Element (CE) message from the network node; and
a predefined value in the terminal device.

5. The method according to claim 1, wherein the configuration on SR transmission comprises one or more Logical Channel Identities (LCIDs) associated with the LCG.

6. A method for a network node configured to operate in a wireless communication network, the method comprising:
transmitting a configuration on Scheduling Request (SR) transmission to a terminal device, wherein:
the configuration is associated with a Logic Channel Group (LCG),
the LCG corresponds to a service offered by the wireless communication system,
the configuration is associated with a plurality of SR transmission modes, and
the plurality of SR transmission modes include:
a first mode in which the terminal device switches an SR transmission between multiple carriers during multiple subframes, and
a second mode in which the terminal device duplicates an SR transmission on multiple carriers during a subframe;
receiving a SR signal from the terminal device, wherein the SR signal is received according to an SR transmission mode selected by the terminal device from the plurality of SR transmission modes associated with the configuration;
allocating uplink resource in response to the received SR signal; and
transmitting, to the terminal device, an uplink resource grant that includes an indication of the allocated uplink resources.

7. The method according to claim 6, wherein the transmitting the configuration on SR transmission to the terminal devices comprises at least one of the following:
sending a Radio Resource Control (RRC) message indicating the configuration on SR transmission; or
sending a Physical Downlink Control Channel (PDCCH) order or Media Access Control (MAC) Control Element (CE) message indicating the configuration on SR transmission.

8. The method according to claim 6, further comprising determining the configuration on SR transmission before transmitting the configuration to the terminal device.

9. The method according to claim 6, wherein the configuration on SR transmission comprises one or more Logical Channel Identities (LCIDs) associated with the LCG.

10. An apparatus configured to operate in a wireless communication network, the apparatus comprising:
one or more processors; and
one or more memories comprising computer program codes, wherein execution of the computer program codes by the one or more processors cause the apparatus to:
determine a Scheduling Request (SR) transmission mode according to a configuration on SR transmission that is associated with a Logic Channel Group (LCG), wherein:
the LCG corresponds to a service needing uplink resources,
the determined SR transmission mode is selected by the apparatus from a plurality of SR transmission modes associated with the configuration, and
the plurality of SR transmission modes include:
a first mode in which the apparatus switches an SR transmission between multiple carriers during multiple subframes, and
a second mode in which the apparatus duplicates an SR transmission on multiple carriers during a subframe; and
transmit at least one SR signal to a network node in the wireless communication network, wherein the at least one SR signal indicates a resource request for uplink transmission and is transmitted according to the determined SR transmission mode.

11. The apparatus according to claim 10, wherein execution of the computer program codes further cause the apparatus to: in response to no uplink resource being granted after transmitting the at least one SR signal, determine a further SR transmission mode and transmit at least one further SR signal, including a resource request for uplink transmission, to the network node according to the determined further SR transmission mode.

12. The apparatus according to claim 11, wherein:
the determined SR transmission mode is the first mode;
execution of the computer program codes causes the apparatus to transmit the at least one SR signal for a predefined period using the first mode; and
the determined further SR transmission mode is the second mode.

13. The apparatus according to claim 10, wherein the configuration on SR transmission is obtained based on one or more of the following:
a Radio Resource Control (RRC) message from the network node;
Physical Downlink Control Channel (PDCCH) order or Media Access Control (MAC) Control Element (CE) message from the network node; and
a predefined value in the terminal device.

14. The apparatus according to claim 10, wherein the configuration on SR transmission comprises one or more Logical Channel Identities (LCIDs) associated with the LCG.

15. A network node configured to operate in a wireless communication network, the network node comprising:
one or more processors; and
one or more memories comprising computer program codes, wherein execution of the computer program codes by the one or more processors cause the network node to perform operations corresponding to the method of claim 6.

\* \* \* \* \*